Figure 1:
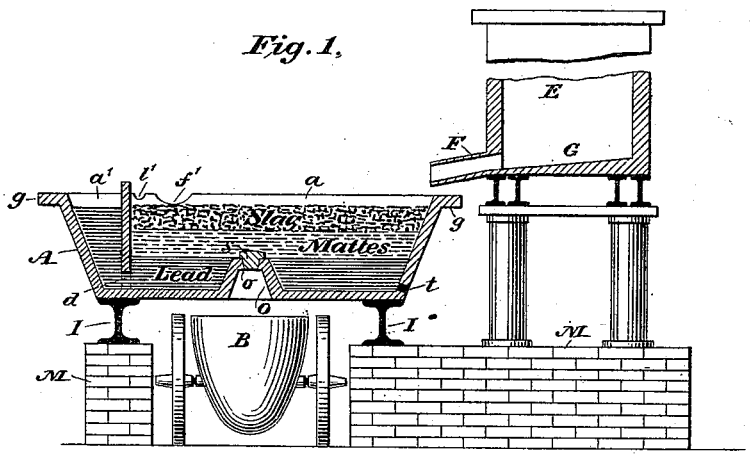

(No Model.)

W. B. DEVEREUX.
APPARATUS FOR SEPARATING LEAD AND BASE BULLION FROM SLAG, MATTES, AND SPEISS.

No. 427,058. Patented May 6, 1890.

Witnesses
Geo. W. Breck
Henry W. Lloyd

Inventor
Walter B. Devereux
By his Attorney
Millard Parker Butler

UNITED STATES PATENT OFFICE.

WALTER B. DEVEREUX, OF GLENWOOD SPRINGS, COLORADO.

APPARATUS FOR SEPARATING LEAD AND BASE BULLION FROM SLAGS, MATTES, AND SPEISS.

SPECIFICATION forming part of Letters Patent No. 427,058, dated May 6, 1890.

Application filed December 4, 1888. Serial No. 292,596. (No model.)

*To all whom it may concern:*

Be it known that I, WALTER B. DEVEREUX, a citizen of the United States, and a resident of Glenwood Springs, Garfield county, State of Colorado, have invented a new and useful Improvement in Apparatus for Separating Lead and Base Bullion from Slags, Mattes, and Speiss, of which the following is a specification.

My invention relates to the separation of lead and the alloys of silver, gold, and other metals with lead, commonly known as "base bullion," from the slags and mattes which are formed in the smelting of the ores of such metals; and the object of the same is to effect the said separation outside of the furnace, while it is still running, in a more convenient manner than has hitherto been possible.

It has heretofore been the practice in smelting silver ores and bullion to make use of a furnace provided with an interior hearth or crucible, into which the bullion, mattes, and slags settle after reduction, and to use in connection therewith some one of the many forms of devices which are in common use for separating out and removing the base bullion or lead while the same is still liquid, and for tapping off the mattes and slags from the furnace either together or separately. The most usual manner of tapping off bullion is to connect the furnace-crucible with an exterior basin, in which the molten base bullion or lead rises, owing to the static pressure of the column of liquid material in the furnace-hearth, and from which the bullion is removed by means of a ladle as it accumulates. The automatic or so-called "siphon" tap, which is largely in use throughout the western portion of the United States for this purpose, is too widely known and used to require description in this connection.

All of the various methods heretofore made use of for tapping off the bullion from furnaces are open in practice to very many and serious objections. The principal objection is, that in cases where the ores to be smelted contain copper, zinc, baryta, or other impurities accretions are liable to be formed in the crucible, the formation of which is extremely difficult to prevent, and the growth of which causes an eventual stoppage of the furnace before it would otherwise be necessary, owing to the stoppage and chilling of the lead-well and the difficulty of keeping the passage open through the walls of the hearth. The accretions, which are hard tough masses, have to be removed by chiseling, necessitating the furnace being put out of blast and cooled off. Now, I have discovered that by tapping at intervals or continuously the fluid contents of the furnace after smelting into an external or movable receptacle provided with means, of the character hereinafter described, for separating the lead or so-called "base bullion" from the slags and mattes, and the former from the latter, I am enabled to effect a much more convenient and economical separation of the base bullion, as well as the mattes, from the slags than has been possible heretofore, and to prevent, also, the formation of accretions, and at the same time to effect great economy in furnace construction, for the reason that a furnace can be used in which nearly the entire crucible is eliminated and in which, by reason of the separation of the various portions of the smelted mass in a vessel outside of the furnace-hearth, greater regularity of working is brought about, thus producing campaigns of much greater length.

My invention, which consists in an apparatus for separating the base bullion and slag from each other and from the mattes or speiss, will be best understood by reference to the accompanying drawings, in which—

Figure 2:
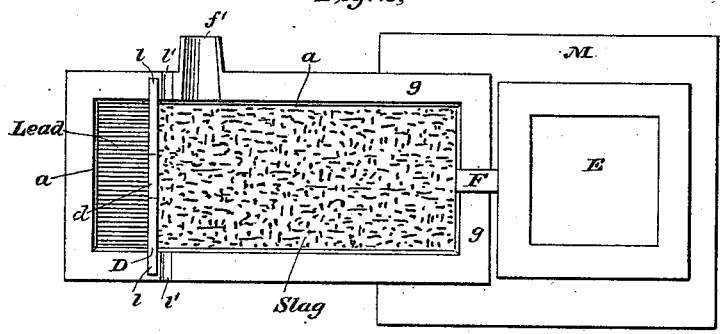
Figure 3:
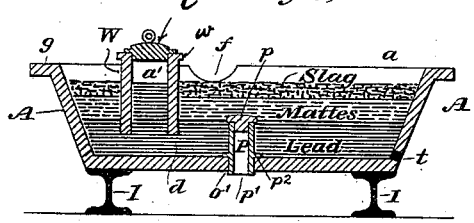
Figure 4:
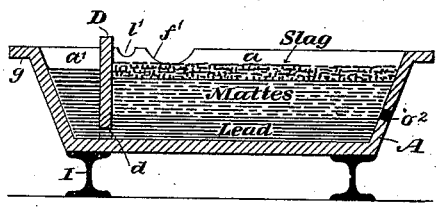

Figure 1 is a vertical longitudinal section of the apparatus; Fig. 2, a plan view of the same. Figs. 3 and 4 are vertical cross-sections of alternate forms of apparatus for use in certain cases.

Similar letters refer to similar parts throughout the several views.

As above stated, the invention consists to a certain degree, although not necessarily, in continuously tapping the smelted mass from the furnace into an exterior separating-vessel. To effect such continuous tapping, the furnace-hearth will naturally be eliminated and the furnace bottom placed close up to the fusion-zone. In cases of furnaces already built it is possible to use the invention successfully by filling the bottom with refractory material up to the tap-hole.

In the drawings, E is an ordinary shaft-furnace, in which the crucible is dispensed with and the bottom G made to incline slightly downward from the back toward the breast, in the manner shown in the views.

F represents the ordinary form of furnace tap-hole and spout, through which the entire smelted portion of the charge is drawn off.

The vessel which in my invention is substituted for the furnace-crucible is represented in the views by A. It may be of any convenient dimensions, shape, or material; but in practice it will be found convenient to make it out of cast-iron, rectangular in shape, as shown the views, with the sides flaring from bottom to top and the corners rounded off. It is provided at its upper rim with a flange $g\ g$, to enable it to be dumped by seizing it with hooks attached to the arm of a crane.

The separation of the lead and base bullion from the other materials tapped into the vessel A is effected in the apparatus of the form shown in Fig. 1 by means of a movable diaphragm D, which may be supported in the receiver or well A in any convenient manner, and the general character of which is shown in the views. The diaphragm is made movable, so that its position may be varied from time to time, as may be necessary, and it may be removed whenever it is desired to clean out the vessel A. The diaphragm is made of cast-iron or other metal, and when the sides of the vessel A are made flaring, as shown in the views, it will be held in a vertical position by its own weight, or, as shown in the views, by means of lugs $l\ l$ at the top, fitting into nicks or grooves $l'\ l'$ upon the upper edge of the side walls or flanges of the receiver A. By providing any number of pairs of grooves upon the upper surface of the vessel it is possible to hold the diaphragm at any desired point, and thereby vary the relative sizes of the compartments $a$ and $a'$, into which the receiver is divided by the diaphragm. Any other convenient method of securing the diaphragm may be adopted.

At the lower end of the diaphragm A is an opening O of any convenient size and shape. The function of this opening is such that when the diaphragm D is placed in the vessel A in the position shown in the views the same is divided into two separate compartments $a\ a'$ of varying size, according to the position of the diaphragm, and these chambers will then be connected with each other at the bottom by means of the opening $d$ in the bottom of the diaphragm.

For the purpose of permitting the tapping off of the mattes as they accumulate a hollow cone or cylinder O is cast upon the bottom of the receiver, which cone is open at its upper extremity $o$. The cone may be cast in one piece with the pot, as shown in Fig. 1, or may be made separate and be attached thereto over an opening in its lower walls in any convenient manner. The opening $o$ may be of any convenient size, and in practice it is made circular, with a diameter of about one to two inches. The height of the upper extremity or apex of the cone above the bottom of the receiver will always be greater than the vertical dimensions of the opening in the diaphragm D, which will be regulated according to the amount of lead and base bullion which settles to the bottom of the receiver. It is necessary to preserve these proportions between the vertical height of the cone and the vertical height of the opening in the diaphragm, in order to prevent the lead and base bullion from being carried out with the mattes when the latter are tapped. The opening $o$ may be closed on the outside of the cone or on the inner extremity in the pot in any convenient manner. In practice, however, it will be found most convenient to close the same by means of a small piece of fire-clay upon the interior, as shown in Fig. 1.

Fig. 3 shows a modified form of apparatus, which may be used with advantage where it is desired to vary from time to time the position of the tap-hole through which the mattes are tapped, and where only a small amount of lead and base bullion accumulates. In this view a lead-well W, made in the form of a cylinder or cone, open at the top and bottom, is substituted for the diaphragm. The lead-well terminates at its upper extremity in a flaring circular flange $w$. The lead-well is covered by means of a separate cover C, which rests upon the flange $w$ of the lead-well and serves to support the cover, and is provided with an interior flange $v$, which fits against the inner edge of the lead-well and serves to keep the cover C in place.

Any method of supporting the lead-well W in the receiver A may be employed that will permit of the removal of the lead-well W from the receiver on such occasions as may be necessary, the essential part of the construction described consisting in the removability of the lead-well. I have found in practice that the simplest method of supporting the lead-well is to hold it in the proper position when the melted slag is first run into the receiver. As soon as the upper crust of the slag cools around the lead-well, it forms a solid support for the well. At the same time a piece of bent iron, with the loop or hook at the top, may be inserted in the upper part of the melted slag, and when it is desired to remove the accumulated slag-crust and lead-well from the receiver it can easily be done by attaching any suitable lifting device to this hook. The cross-section of the lead-well need not necessarily be cylindrical. It may be rectangular, elliptical, or even octagonal; but in practice the form shown in the drawings will be found to be preferable.

The receiver A is provided at its bottom with an opening $o'$, drilled therein, and a small iron pipe P, open at both ends at $p$ and $p'$, is inserted in the opening. This may be provided with the flange or collar $p^2$ for holding it in position in the opening $o'$, and this pipe is of such length that it will rise vertically in the interior of the receiver and pass up through the lead in the bottom of the receiver and into the layer of mattes which settles above the same. This pipe may be closed in any convenient manner and at either end, but preferably at the upper end, by a piece of fire-clay, as shown in Fig. 2, or by an iron plug.

When a variation in the amount of lead settling in the bottom of the receiver is required, pipes of varying lengths may be substituted, according to the requirements of the case. If desired, an opening may be provided in any one of the side walls of the receiver A, as shown in Fig. 4, at a distance above the bottom of the same, corresponding to the top of the cone or pipe, which will produce the same effect. Such an opening is shown by $o^2$ in Fig. 4. This opening $o^2$ may be closed in any convenient manner; but in practice a stopping of fire-clay may be used or a cast-iron plug, or, in fact, any other substance that will not cause the generation of gases in the interior of the receiver by reason of its proximity to the smelted mass.

The invention above described is not necessarily limited to the particular agencies shown. Any device that will divide the receiver into compartments connected at the bottom may be used to effect a separation of the lead from the slags, mattes, and speiss, and any device other than those described that will do the work may be used for removing the liquid mattes and slags. Thus, for example, an ordinary siphon or automatic tap may be used for this latter purpose. Such a tap would preferably be suspended over the edge of the receiver and passed downward into the mass of liquid mattes and speiss to a point just above the line to which the lead rises, and would be provided with suitable devices for causing it to operate intermittently whenever the receiver becomes full.

The form of lead-well shown in Fig. 3 as a cylinder supported in the receiver and open at both top and bottom and the ordinary conical lead-well with a hole at the apex are in effect nothing more than the diaphragm shown in Fig. 1 so curved that its ends would eventually meet, the sole difference being that in the former cases the lead within the compartment $a'$ comes in contact with a single dividing wall, while in the latter case it comes in contact with the walls of a compartment formed partly of three of the walls of the receiver and a fourth wall formed by the diaphragm; hence the devices are believed to be the equivalent of each other and their method of operation the same.

For the purpose of facilitating the discharge of slag when the receiver becomes full, a discharge lip or spout $f$ is provided at the upper edge of the vessel, as shown in all of the views, through which the slag can flow off when the vessel becomes full and before tapping the mattes, and an opening $t$ at the bottom of the receiver is provided for drawing off its contents if the receiver becomes choked up.

The method of separation effected by the apparatus and the mode of operation of the same are as follows: In the smelting of lead-ores, as is well known, the various products and by-products of the furnace differ in specific gravity. The lead and base bullion as they issue from the furnace are slightly heavier than the mattes, speiss, and slags which flow out with them, and will consequently settle to the bottom of any vessel in which all of the furnace products are collected while molten, allowing the mattes, speiss, and slags to float on the top of the lead. Where the entire contents of the furnace-crucible is tapped into one compartment of a vessel divided into two compartments which are connected at the bottom the lead as it settles to the bottom of the compartment into which the mass is tapped will flow through the opening between the compartments into the other compartment, and will rise in that compartment in proportion as the static pressure of liquid in the first compartment increases. The slag, mattes, and speiss, although lighter than the lead, being liquid, will keep the static pressure of the column of liquid in the two compartments practically constant, while the slag, being lighter than the mattes and speiss, will form the top of the mass, and the top layer of the same will cool rapidly and form a crust, which answers all the purposes of a cover to the receiver. The effect of the insertion of the movable diaphragm D, or its equivalent, the lead-well W, into the receiver A is to divide the latter into two compartments $a$ and $a'$, which are connected with each other through the open bottom of the movable diaphragm or the lead-well. When the melted material from the furnace, consisting of slag, mattes, speiss, and bullion, or either of them, is allowed to run, the constituents of the same immediately assume positions in the receiver in accordance with their relative specific gravity, the lead or bullion forming the lowest layer. As the lead or bullion accumulates in the receiver, it rises to a height in the compartment formed by the diaphragm, or in the lead-well, equal to the static pressure of the material in the receiver outside of the lead-well. The lead may be dipped from this compartment with a ladle from time to time as fast as it accumulates, it being necessary to leave only the layer of lead or bullion in the outside receiver of sufficient depth to seal the entrance into the compartment, as otherwise the mattes or speiss which float directly on top of the lead or bullion would enter the compartment $a'$ under the wall of the lead-well, or under the diaphragm, if this latter form be used, thereby causing great trouble and inconvenience. When a sufficient amount of mattes or speiss has accumulated in the receiver, the tap-hole in the cone or pipe or in the side walls is then opened, and the mattes and speiss allowed to run out into any desired receptacle—such as the slag-buggy B, Fig. 1—until slag commences to run out of the tap-hole, when the orifice is closed. By this means the matte is obtained in a comparatively pure condition and suitable for subsequent treatment. If by any means, or if, owing to any neglect, lead or bullion is drawn out of the cone, pipe, or tap-hole, or slag is allowed to run out with the matte, the former, after cooling, can easily be separated from the bottom of the matte, and the latter can be broken off from the top of the matte. The slag which occupies the upper portion of the receiver runs over through the spout $f$ into the slag-buggy and is carried away.

The object of this invention is to carry out a threefold separation in the exterior receiver, by means of which lead and bullion, matte and speiss, and slag are obtained in a comparatively pure state. If from any cause the mattes and material in the slag-pot become solidified, so that there is not sufficient room for the melted materials to separate according to their specific gravity, thereby causing matte and bullion, or either of them, to flow over the slag-spout into the slag-buggy, the receiver can easily be cleaned by attaching a lifting device to the solidified upper slag-crust. By this means the whole solid mass, including the lead-well, can be lifted out in a very short time, leaving the liquid lead and bullion in the bottom, as, owing to its low melting temperature, it will very seldom become solid. Another diaphragm or lead-well is then inserted into the receiver and the melted contents of the furnace are allowed to run once more into the receiver and the operation goes on, as hereinbefore described. Should all the contents of the receiver become solid, it may be moved away from the furnace and another receiver substituted. As soon as the slag mass becomes cool, it is broken up, and the diaphragm D or the lead-well W is removed and made ready for use again. The lead and base bullion, after removal from the compartment $a'$, will in practice be cast into bars or ingots, as may be desired.

I am aware that attempts have been made to effect twofold separation of the ingredients of the mass tapped from smelting-furnaces by means of stationary devices—such as the so-called "automatic" or "siphon" tap above referred to—attached to the furnace-crucible and also by means of a stationary lead-well placed outside of the furnace, and I am also aware that it is old to smelt ores in a furnace without a crucible, and that it is old to tap from a furnace into a movable receiving-well containing in its bottom or side walls openings for the purpose of effecting a separation of the materials contained therein; but I believe it is new so to combine the various agencies above described that a threefold separation of the ingredient of the smelted mass is effected in a movable vessel outside of the furnace containing a lead-well so constructed and arranged that it may be removed therefrom at pleasure.

It will be observed that the above-described apparatus differs from those forms described and claimed in all other Letters Patent previously granted to me, in that it effects an intermittent threefold separation, and in that its operation is dependent upon the accumulation of the mattes in the receiver. In the various forms of apparatus described in the aforesaid Letters Patent no intermittent tapping of the mattes from a point above the line to which the lead or base bullion rises in the receiver is contemplated, nor is the same possible. Such openings as are shown in the side walls of the receiving-well in these Letters Patent are for a different purpose, and are so placed with reference to the position of the lead or base bullion that a separation of the mattes from the former is precluded.

Having heretofore on the 12th day of January, 1888, filed a separate application for Letters Patent for apparatus for separating lead and base bullion from slags and mattes by means of some of the agencies herein described, in which application said agencies are claimed in other combinations, I therefore disclaim the various combinations in the claims of said application contained so far as the present Letters Patent are concerned, and

I claim as my invention—

1. The combination, substantially as hereinbefore set forth, with an external well into which the contents of the smelting-furnace is tapped, of a diaphragm placed in said well, whereby the same is divided into two compartments, an opening at the base of the diaphragm connecting said compartments, and an opening in the walls of the well, so arranged that the contents thereof may be tapped off at a point above the level of the opening in the diaphragm and at a level lower than that of the overflow of the slag when the well becomes full.

2. The combination, substantially as hereinbefore set forth, with an external receiving or collecting well, into which the contents of the smelting-furnace is tapped, of a diaphragm placed in said well, whereby the same is divided into two compartments, an opening at the base of the diaphragm connecting said compartments, an opening in the walls of the well, so arranged that the contents thereof may be tapped off at a point above the level of the opening in the diaphragm and at a lower level than the point of overflow of slag when the well becomes full, and means, substantially as described, for closing said last-mentioned opening.

3. The combination, substantially as hereinbefore set forth, with a portable receiving or collecting well, into which the contents of the smelting-furnace is tapped, of a diaphragm placed in said well, whereby the same is divided into two compartments, an opening at the base of said diaphragm connecting said compartments, and an interior pipe in the bottom of the well projecting upward into the same, whereby the mattes in the interior may be drawn off at a point above the level of the opening in the diaphragm and at a lower level than the point of overflow of the slag when the well becomes full.

4. The combination, substantially as hereinbefore set forth, with a portable receiving or collecting well, into which the contents of the smelting-furnace is tapped, of a diaphragm placed in said well, whereby the same is divided into two compartments, an opening at the base of said diaphragm connecting said compartments, and an interior pipe in the bottom of the well projecting upward into the same, whereby the mattes in the interior may be drawn off at a point above the level of the opening in the diaphragm and at a lower level than the point of overflow of the slag when the well becomes full, and means, substantially as described, for closing the orifices of said pipe.

5. The combination, substantially as hereinbefore set forth, with a portable receiving or collecting well, into which the contents of the smelting-furnace is tapped, of a diaphragm placed in said well, whereby the same is divided into two compartments, an opening at the base of said diaphragm connecting said compartments, a conical pipe in the bottom of the well projecting upward into the same, and an opening at the apex of said pipe, whereby the mattes in the interior of the well may be drawn off at a point above the level of the opening in the diaphragm and at a lower level than the point of overflow of the slag when the well becomes full.

6. The combination, substantially as hereinbefore set forth, with a portable receiving or collecting well, into which the contents of the smelting-furnace is tapped, of a diaphragm placed in said well, whereby the same is divided into two compartments, an opening at the base of said diaphragm connecting said compartments, a conical pipe in the bottom of the well projecting upward into the same, an opening at the apex of said pipe, whereby the mattes in the interior of the well may be drawn off at a point above the level of the opening in the diaphragm and at a lower level than the point of overflow of the slag when the well becomes full, and means, substantially as described, for closing the orifice of said pipe.

In testimony that I claim the foregoing as my invention I have signed my name, in presence of two witnesses, this 3d day of December, 1888.

WALTER B. DEVEREUX.

Witnesses:
EDWIN T. RICE, Jr.,
WILLARD PARKER BUTLER.